Nov. 18, 1947.     C. A. SYLVANDER     2,431,149
DRIVE CONTROL MECHANISM
Filed May 17, 1945     3 Sheets-Sheet 1
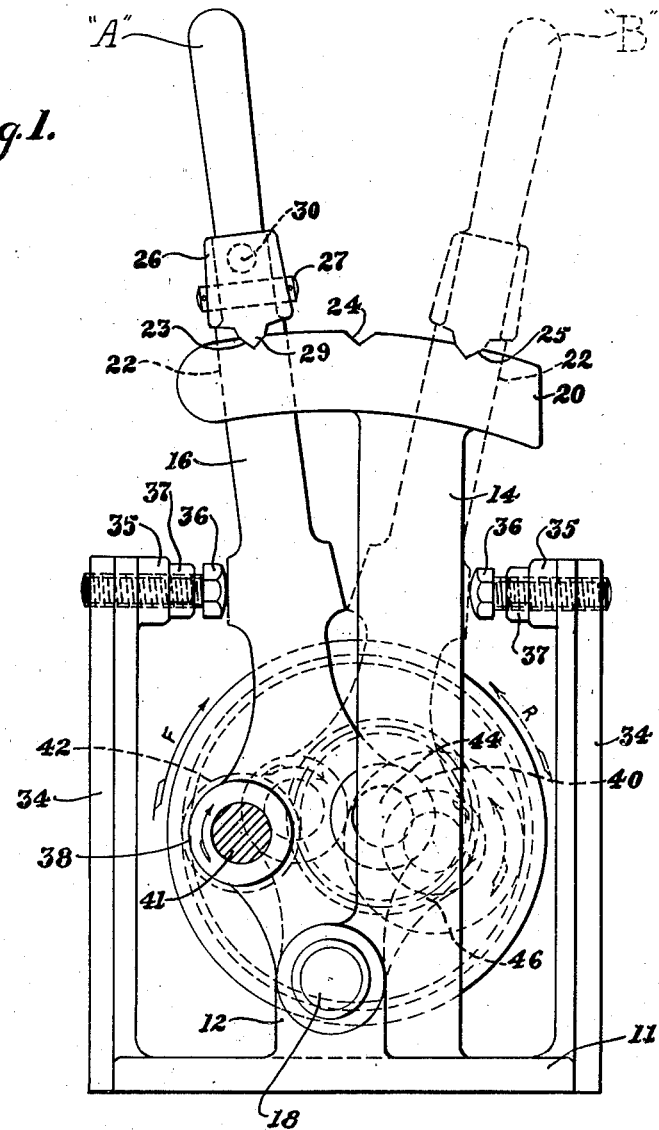

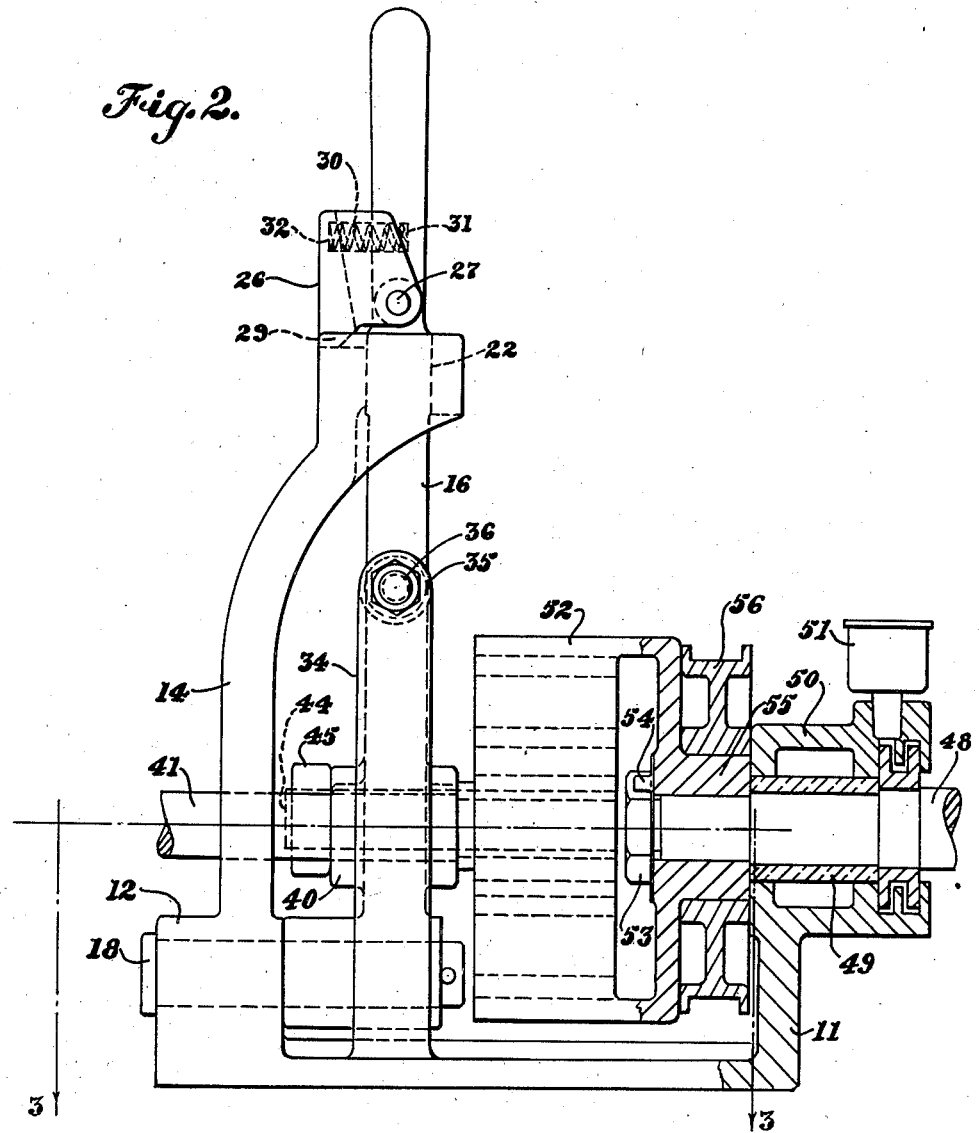

Nov. 18, 1947.   C. A. SYLVANDER   2,431,149
DRIVE CONTROL MECHANISM
Filed May 17, 1945   3 Sheets-Sheet 3
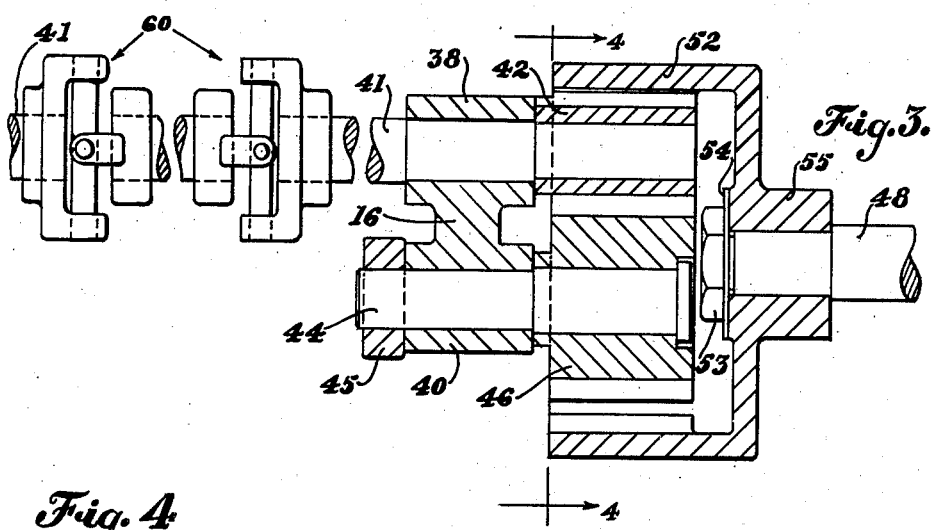
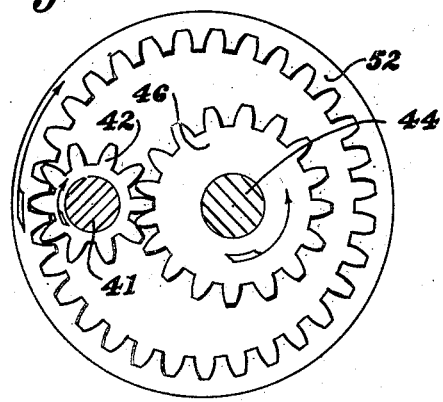
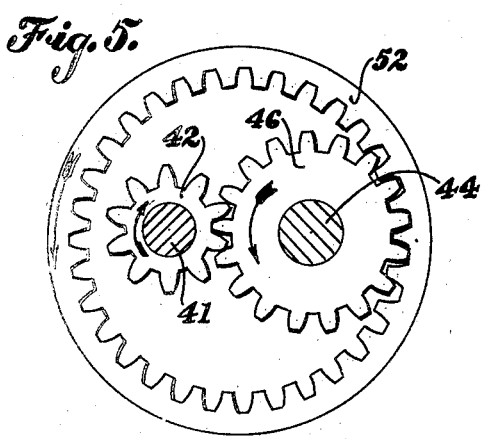
Inventor
Carl A. Sylvander
by Harold E. Cole
Attorney.

Patented Nov. 18, 1947

2,431,149

UNITED STATES PATENT OFFICE 2,431,149

DRIVE CONTROL MECHANISM

Carl A. Sylvander, Taunton, Mass.

Application May 17, 1945, Serial No. 594,277

7 Claims. (Cl. 74—355)

1

This invention relates to drive control mechanism, particularly to a gear transmission arrangement for both forward and reverse driving.

The principal object of my invention is to provide a simple and effective drive control mechanism whereby a change from a forward to a reverse movement can be made quickly, quietly and with ease.

Another object is to so construct said mechanism that it is certain in operation, simple to assemble and relatively inexpensive to manufacture.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a front elevational view of my drive control mechanism.

Figure 2 is a side elevational view thereof, partly in section.

Figure 3 is a sectional view taken on the line 3—3 of Figure 2.

Figure 4 is a sectional view taken on the line 4—4 of Figure 3, showing the gears in mesh for the forward drive, while Figure 5 is a similar view, but showing the gears in mesh for a reverse drive.

As illustrated, my mechanism is supported by a base 11 having a bearing portion 12 from which a supporting arm 14 extends upwardly and which serves as a guide and support for a gear shifting means in the form of a hand lever 16 that pivots on a stud 18 mounted in said bearing portion 12. Said arm 14 has an angular portion 20 extending laterally, which has a long slot 22 in which said hand lever 16 is adapted to move laterally. Three V-shaped grooves 23, 24 and 25 are provided in said portion 20 and are in communication with said slot 22. A dog 26 is fastened to said hand lever 16 by a pin 27. Said dog has a beveled tooth 29 which can enter any one of the notches 23, 24 or 25 as later described. In the handle portion of said lever 16 is a recess 31, and in said dog 26 is another recess 32 spaced from said recess 31. A spring 30 is set in said recesses 31 and 32 and is normally under compression. Upon movement of said lever handle laterally the

2 compression of said spring 30 is overcome to permit said beveled tooth 29 to be moved out of one of said grooves 23, 24 and 25 and enter another, as desired.

On each side of the base 11 two arms 34 extend upwardly which have bosses 35 at their upper ends in which are threaded set screws 36 which form two adjustable stops. Said screws 36 are held in a predetermined position by check nuts 37 which determine the range of movement of said control lever 16 laterally.

At the lower extremity of said lever 16 two bearings 38 and 40 are formed. In said bearing 38 an engine or power driver shaft 41 is rotatably mounted on the end of which shaft a driver pinion 42 is mounted. A stud 44 is set in said lever bearing 40, being held by a collar 45. On said stud 44 an intermediate gear 46 revolves, and is always in mesh with pinion 42, since both are mounted in said lever bearings 38 and 40 so movement of said lever moves both.

A propeller shaft 48 is mounted in a bushing 49 which in turn is mounted in a bearing 50 which is part of said base 11 and is lubricated by any well known means such as a grease cup 51. On the end of said propeller shaft 48 is an internal driven gear 52 held to said shaft by a nut 53 and lock washer 54. On the hub 55 of said internal gear 52 is fastened securely a brake wheel 56 which is adapted to stop rotation of said engine drive shaft 41 and said internal gear 52 when desired.

Said driver pinion 42 and intermediate gear 46 are operated within said internal driven gear 52. On said engine shaft 41 are mounted double universal joints 60 which allow for the shifting movement of that portion of the engine shaft 41 beyond said joints when moved by said hand lever 16. By shifting said lever 16 from position A to B shown in Figure 1 of the drawings said engine shaft pinion 42 and intermediate gear 46 are together shifted from the forward drive position shown in Figure 4 of the drawings to the reverse drive position shown in Figure 5 of the drawings where said intermediate gear 46 is shown meshing with internal gear 52.

When said lever 16 is in position A with the beveled end or tooth 29 located in notch 23 the gears are positioned to drive the propeller forward. When said tooth 29 is in the middle notch 24 said gears 42 and 46 are in neutral position and out of mesh with gear 52. When said lever tooth 29 is in notch 25 said gears drive the propeller shaft 48 in reverse direction.

To drive forward, the lever 16 is operated to move its beveled tooth 29 into notch 23 whereupon said engine drive shaft 41 rotates said pinion 42 which in turn rotates said internal drive gear 52, to drive said propeller shaft 48.

To reverse the drive the brake wheel 56 is applied in the usual manner to stop rotation of said shaft 41 and said lever 16 is operated to move said tooth 29 into notch 25. Said intermediate gear 46 thereby meshes with said internal gear 52 and since it is rotated by pinion 42 it rotates said propeller shaft 48 in a direction opposite to its forward drive rotation.

What I claim is:

1. Drive control mechanism comprising a driven shaft, an internal gear mounted thereon, a movable lever, a driver shaft, a pinion mounted on said latter shaft, an intermediate gear permanently in mesh with said pinion, a stud on which said intermediate gear is rotatably mounted, said driver shaft and stud being mounted on said lever and movable therewith, said pinion and intermediate gear being within said internal gear either one of which is adapted to mesh with said internal gear to the exclusion of the other, and supporting means for said lever.

2. Drive control mechanism comprising a driven shaft, an internal gear mounted thereon, a movable lever, a driver shaft connected to and movable with said lever, a pinion mounted on said latter shaft, an intermediate gear permanently in mesh with said pinion, a stud movable with said lever on which said intermediate gear is rotatably mounted, said pinion and intermediate gear being movable with said lever and being within said internal gear either one of which is adapted to mesh with said internal gear to the exclusion of the other, and supporting means for said lever, said pinion and intermediate gear being of such size relative to said internal gear that the former two may both be within the interior of and out of mesh with said internal gear.

3. Drive control mechanism comprising a driver shaft, a pinion mounted on and rotatable with said shaft, said driver shaft embodying universal joint means, another gear in mesh with said pinion, a stud on which said other gear rotates, an internal gear, a rotatable shaft on which said internal gear is mounted, said pinion and other gear being within said internal gear either one of which is adapted to mesh with said internal gear to the exclusion of the other, a movable lever embodying bearing portions, said driver shaft and said stud being mounted in and movable with said bearing portions, and supporting means for said lever.

4. Drive control mechanism comprising a rotatable shaft, an internal gear mounted thereon, a freely movable lever, two intermeshing gears movably connected to and controlled by said lever within said internal gear either one of which is adapted to mesh with said internal gear to the exclusion of the other upon actuation of said lever to predetermined positions, another rotatable shaft on which one of said intermeshing gears is mounted, a shaft on which the other of said intermeshing gears rotatably is mounted, and supporting means for said lever and intermeshing gears.

5. Drive control mechanism comprising a shaft, an internal gear mounted thereon, a movable lever, a driver shaft movably connected to said lever, a pinion mounted on said latter shaft, an intermediate gear in mesh with said pinion, a stud on which said intermediate gear is rotatably mounted, said driver shaft and stud being connected to and movable with said lever, said pinion and intermediate gear being within said internal gear either one of which is adapted to mesh with said internal gear to the exclusion of the other, and supporting means for said lever.

6. Drive control mechanism comprising a base, a bearing portion supported by said base, a supporting arm connected to and extending from said bearing portion, a lever supported by said bearing portion, two bearings in said lever, a pinion shaft mounted in one said bearing, a pinion mounted on said driver shaft, an intermediate gear in mesh with said pinion, a stud mounted in the other said bearing and on which said intermediate gear is rotatably mounted, an internal gear, and a shaft on which said internal gear is mounted, said pinion and intermediate gear being within said internal gear either one of which is adapted to mesh with said internal gear to the exclusion of the other.

7. Drive control mechanism comprising a base, a bearing portion supported by said base, a supporting arm extending from said bearing portion, a lever supported by said bearing portion, two bearing portions mounted in said lever, a driver shaft mounted in a said lever bearing portion embodying a universal joint, a pinion mounted on said driver shaft, an intermediate gear in mesh with said pinion, a stud mounted in said other lever bearing portion on which said intermediate gear is rotatably mounted, an internal gear, and a shaft on which said internal gear is mounted, said pinion and intermediate gear being within said internal gear either one of which is adapted to mesh with said internal gear to the exclusion of the other.

CARL A. SYLVANDER.

REFERENCES CITED

The following references are of record in the file of this patent:

UNITED STATES PATENTS

| Number | Name | Date |
|---|---|---|
| 612,257 | Mead | Oct. 11, 1898 |
| 771,861 | Curtis | Oct. 11, 1904 |
| 1,767,290 | Keyser | June 24, 1930 |